United States Patent [19]

England et al.

[11] Patent Number: 5,310,795
[45] Date of Patent: May 10, 1994

[54] CARBAMATE-FUNCTIONALIZED ADDITION POLYMERS AND ADDITION POLYMER-RUBBER COPOLYMERS DERIVED THEREFROM

[75] Inventors: William P. England, Clifton Park; Gregory J. Stoddard, Schenectady; James J. Scobbo, Jr., Guilderland, all of N.Y.

[73] Assignee: General Electric Company, Schenectady, N.Y.

[21] Appl. No.: 77,262

[22] Filed: Jun. 17, 1993

Related U.S. Application Data

[62] Division of Ser. No. 33,208, Mar. 18, 1993, abandoned.

[51] Int. Cl.$^5$ .............................................. C08L 55/00
[52] U.S. Cl. ........................................ 525/74; 525/52; 525/71; 525/75; 525/77; 525/197; 525/207; 525/211; 525/217; 525/208; 525/214
[58] Field of Search ....................... 525/52, 21, 74, 75, 525/77, 197, 207, 211, 217

[56] References Cited

U.S. PATENT DOCUMENTS

| | | | |
|---|---|---|---|
| 4,060,689 | 11/1977 | Harris | 560/29 |
| 4,977,049 | 12/1990 | Kato | 430/49 |
| 5,068,284 | 11/1991 | Ullman et al. | 525/67 |
| 5,124,410 | 6/1992 | Campbell | 525/293 |

OTHER PUBLICATIONS

Finkenaur et al., Polymer Preprints (ACS) 23, 91-2 (1982).
Chien et al., Journal of Polymer Science: Polymer Chemistry Edition, 23, 2247-2254 (1985).

*Primary Examiner*—Joseph L. Schofer
*Assistant Examiner*—Mark Nagumo
*Attorney, Agent, or Firm*—William H. Pittman

[57] ABSTRACT

Novel addition polymers and copolymers derived from carbamate-functionalized vinyl monomers, and optionally one or more conventional vinyl monomers such as acrylonitrile and/or styrene, are disclosed. When the addition polymers or copolymers are melt processed with an elastomer containing moieties reactive with amines, novel addition polymer-rubber copolymers are formed which are useful as compatibilizers and impact modifiers in plastic blends, such as AES.

11 Claims, No Drawings

CARBAMATE-FUNCTIONALIZED ADDITION POLYMERS AND ADDITION POLYMER-RUBBER COPOLYMERS DERIVED THEREFROM

This application is a division of application Ser. No. 08/033,208, filed Mar. 18, 1993, now abandoned.

BACKGROUND OF THE INVENTION

This invention relates to addition polymer compositions derived from free radical polymerizable olefinic monomers, and more particularly to addition polymers containing reactive functionalities. It further relates to addition polymer-rubber copolymer compositions prepared from an addition polymer containing reactive functionalities and a functionalized elastomer reactive therewith, and to a process of preparing the copolymer composition. More specifically, it relates to acrylonitrile-EPDM-styrene, AES, copolymer blends.

Commercial methods for toughening brittle thermoplastics usually involve blending into the plastic an elastomer having a low glass transition temperature. Often, however, the immiscibility and incompatibility of the elastomer with the thermoplastic produce poor physical properties in the blend. A combatibilization strategy is then required to improve physical properties. One strategy involves incorporating a copolymer prepared from the thermoplastic and the elastomer in the blend. The copolymer serves to improve rubber phase dispersion and adhesion, and thereby improves compatibility and physical properties.

Graft copolymers derived from addition polymers and elastomers have traditionally been prepared by polymerizing an olefinic monomer in the presence of a rubber substrate and a free radical initiator. The graft reaction can be accomplished in emulsion, suspension, solution or bulk processes. While such processes are widely used, they disadvantageously require handling and disposing of monomers, solvent, and reaction by-products. Alternatively, addition polymer-rubber copolymers can be formed by melt processing a functionalized addition polymer with a reactive functionalized elastomer. Amines, for example, are known to react with a variety of electrophilic moieties, such as anhydrides, epoxides, and alkyl halides. However, amine-functionalized addition polymers are not readily available for copolymer formation.

It is well known that the free radical polymerization of olefinic monomers containing amine functionalities is fraught with problems. Amine oxidation, free radical trapping, and chain transfer are so extensive that polymerization typically is never realized. Attempts have been made to polymerize the hydrohalide salts of amine-functionalized vinyl monomers, but the variety of organic solvents in which these materials are soluble is limited. As a further disadvantage, amines react with esters, thereby prohibiting the copolymerization of amine-functionalized vinyl monomers with acrylate comonomers. Methods which circumvent some of the aforementioned problems have been developed to produce amine-functionalized addition polymers. For example, U.S. Pat. No. 5,124,410 discloses graft polymers derived from addition polymers of olefinically unsaturated monomers containing protected amine moieties. The protected moieties are disclosed to be capable of conversion at high temperature to free amino groups, which in turn are capable of undergoing reaction with reactive groups on other polymers, thereby leading to copolymer formation. In particular, the graft polymers are taught to comprise a base polymer chain consisting essentially of structural units derived from an olefinically unsaturated hydrocarbon with grafted moieties thereon derived, for example, from t-butyl allylcarbamate. They are further taught to undergo thermal degradation at high temperatures with the elimination of olefin and carbon dioxide, to yield amino-substituted polymers. The latter are capable of reaction with other polymers containing reactive functionalities, to form copolymers.

There are some disadvantages to the graft polymers disclosed in U.S. Pat. No. 5,124,410, and to the process of preparing these graft polymers. Specifically, the concentration of grafted moieties is limited to levels not greater than about 3 weight percent. Moreover, during the process of preparing the graft polymer, the amine protected vinyl comonomer may homopolymerize; for example, to form oligomeric species. Alternatively, there may be unreacted monomer present in the graft polymer.

In view of the above, it remains a desirable goal to prepare an addition polymer from a free radical polymerizable olefinic monomer containing protected amine functionalities. It would be further desirable to control the concentration of protected amine moieties. It would also be desirable if the monomers were soluble in a variety of organic solvents. It would be even more desirable to eliminate problems associated with unreacted monomer in the polymer and homopolymerization of the monomer. To be truly useful, it is necessary for the addition polymer to be cost effective in terms of materials and preparation. If an addition polymer could be prepared containing amine or protected amine moieties, then that polymer might be exploited most advantageously to produce addition polymer-rubber copolymers useful as compatibilizers and useful for improving the physical properties of plastic blends.

SUMMARY OF THE INVENTION

In a first aspect, the invention comprises a novel class of addition polymers derived from the free radical polymerization of a vinyl monomer containing carbamate moieties. Optionally, the carbamate-functionalized olefinic monomer may be copolymerized with at least one conventional free radical polymerizable vinyl monomer, such as styrene and/or acrylonitrile, to yield novel carbamate-functionalized copolymers.

The novel carbamate-functionalized polymers and copolymers may be represented by formula I hereinbelow:

$$X^1 \!\!-\!\!(Z^1)_k\!\!-\!\!(Z^2)_l\!\!\!\overline{)_m} X^1 \qquad \text{(I)}$$

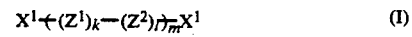

wherein:

each $X^1$ is a chain terminating group;

$Z^1$ is a carbamate-functionalized divalent unit derived from a carbamate-functionalized free radical polymerizable vinyl monomer;

$Z^2$ is a divalent unit derived from one or more free radical polymerizable vinyl comonomers;

m is the number of structural units and is an integer having a value of 1 or greater;

k is the number of carbamate-functionalized units and is an integer having a value of 1 or greater;

l is the number of comonomer units and is 0 or an integer having a value of 1 or greater. Note that k and l may vary independently from one structural unit to the next.

The novel addition polymers and copolymers of this invention are capable of reacting with elastomers functionalized with moieties reactive with amines, thereby forming useful addition polymer-rubber copolymers. Advantageously, the carbamate-functionalized vinyl monomers from which the addition polymers and copolymers are derived are soluble in a variety of organic solvents and can be prepared cost effectively. More advantageously, the process of preparing the addition polymers and copolymers of this invention results in essentially complete incorporation of the carbamate-functionalized monomer in the copolymer, to the exclusion of oligomer formation or other homopolymerization. Even more advantageously, it is possible to control the concentration of carbamate moieties to almost any desired level.

In a second aspect, this invention is a process of preparing an addition polymer-rubber copolymer composition. The process comprises melt reacting a mixture containing the carbamate-functionalized addition polymer or copolymer identified hereinabove with an elastomer containing moieties reactive with amines. The melt processing is conducted under reaction conditions such that the addition polymer-rubber copolymer composition is formed.

In a third aspect, this invention is a novel addition polymer-rubber copolymer composition represented by formula II:

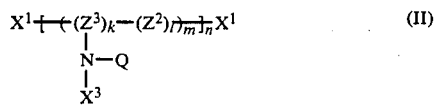

wherein:

Q is an elastomeric segment derived from an elastomer functionalized with moieties reactive with amines;

$Z^3$ is a trivalent unit derived from a carbamate-functionalized divalent unit in an addition polymer by removal of the carbamate group;

$X^3$ is hydrogen or a chemical linkage between N and Q (for example, $X^3$ and N form a maleimide group);

n is the number of addition polymer side chains bound to the elastomer and is an integer equal to 1 or greater; and $X^1$, $Z^2$, k, l and m are as previously defined.

The novel addition polymer-rubber copolymers of this invention are useful as compatibilizers and impact modifiers in blends of plastic materials.

In a fourth aspect this invention is a novel acrylonitrile-EPDM-styrene (AES) copolymer blend comprising poly(styrene-co-acrylonitrile) (SAN) and an addition polymer-EPDM rubber copolymer represented by Formula II hereinabove, wherein the addition polymer is a carbamate-functionalized SAN. The novel AES copolymer blend of this invention is a useful plastic characterized by an Izod impact strength of at least about 160 joules/m. The novel AES blend is prepared by simple melt blending which offers advantages over prior art preparations involving graft reactions.

DETAILED DESCRIPTION OF THE INVENTION

In accordance with the invention, the novel addition polymers and copolymers are characterized by the presence of carbamate functionalities. Preferred carbamate-functionalized addition polymers and copolymers of this invention are represented by formula III:

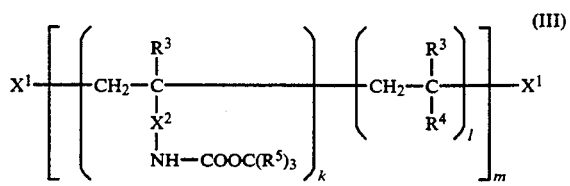

wherein:

each $R^3$ is independently hydrogen or $C_{1-5}$ alkyl, preferably hydrogen or methyl;

each $R^4$ is independently aryl or alkaryl of 1 to 20 carbon atoms; an ester of 1 to 20 carbon atoms, including ester groups such as methoxycarbonyl, ethoxycarbonyl, propoxycarbonyl and butoxycarbonyl; alkoxy of 1 to 20 carbon atoms; acetoxy; or cyano;

each $R^5$ is independently a $C_{1-10}$ hydrocarbyl moiety, such as alkyl, phenyl or substituted phenyl, provided that at least one $R^5$ is alkyl;

$X^2$ is

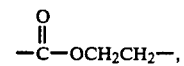

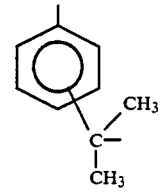

or

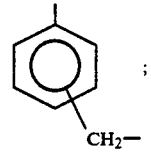

k is an integer in the range from 1 to about 1000;

l is 0 or an integer from 1 to about 4000, and k and l may vary independently from unit to unit;

m is an integer from 1 to about 100 and represents the number of carbamate-functionalized monomer and comonomer alternations when l is 1 or greater; and $X^1$ is a chain terminating group, such as hydrogen, alkyl, alkoxy, aryl, acyloxy, or alkylthio.

More preferably, l is 1 or greater, and the addition polymer is a copolymer wherein $R^4$ is aryl, alkaryl and/or cyano. Even more preferably, $R^4$ is phenyl or cyano, and the k divalent units are derived from N-t-hydrocarbyloxycarbonyl-2-aminoethyl acrylates, {1-methyl-1-[3-(1-methylethenyl)phenyl]ethyl}carbamic acid t-alkyl or t-aralkyl esters, or N-t-hydrocarbyloxycarbonyl-m,p-vinylbenzylamines. Most preferably, the k divalent units are derived from N-t-butoxycarbonyl-2-aminoethyl acrylate, {1-methyl-1-[3-(1-methylethenyl)phenyl]ethyl}carbamic acid 1,1-dimethylethyl ester, or N-t-butoxycarbonyl-m,p-vinylbenzylamine.

Carbamate-functionalized vinyl monomers suitable for forming the addition polymers and copolymers of this invention can be prepared in a variety of ways. One method of preparation exploits the reaction of isocyanates with alcohols to form carbamates. Thus, an isocyanate-substituted vinyl monomer is reacted with a tertiary alcohol, R₃COH, provided that in this case at least one of the R substituents is an alkyl moiety, to yield a carbamate-functionalized vinyl monomer.

Another method exploits the reaction of amines with dialkyl dicarbonates to form carbamates. Thus, an amine-substituted vinyl monomer is reacted with a di-t-alkyl dicarbonate, R₃COC(O)OC(O)OCR₃, provided that in this case at least one of the R substituents is an alkyl moiety, to yield a carbamate-functionalized vinyl monomer. Other methods of forming carbamate-functionalized vinyl monomers may be apparent to one skilled in the art.

One preferred class of carbamate-functionalized vinyl monomers useful for preparing the addition polymers and copolymers of this invention comprises N-t-hydrocarbyloxycarbonyl aminoalkyl acrylates represented by formula IV:

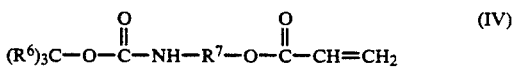

wherein each $R^6$ is independently a $C_{1-10}$ hydrocarbyl moiety, such as alkyl, phenyl, or substituted phenyl, provided that at least one $R^6$ is alkyl; and wherein $R^7$ is phenylene, alkyl-substituted phenylene, benzylene, or alkylene having from 2 to about 20 carbon atoms. Preferably, each $R^6$ is methyl and $R^7$ is a C2 alkylene chain, and the compound is N-t-butoxycarbonyl-2-aminoethyl acrylate.

The acrylates represented by structure V are easily prepared. As an example, 2-aminoethanol will react with di-t-butyl dicarbonate to yield N-t-butoxycarbonyl-2-aminoethanol. The latter reacts with acryloyl chloride to yield N-t-butoxycarbonyl-2-aminoethyl acrylate. The aforementioned synthesis can be generalized by substituting other alkanolamines or aminophenols for aminoethanol and by substituting other dicarbonates for d-t-butyl dicarbonate.

A second preferred class of carbamate functionalized vinyl monomers comprises {1-methyl-1-[3-(1-methylethenyl)phenyl]ethyl}carbamic acid t-alkyl or t-aralkyl esters, such as the 1,1-dimethylethyl ester, having the structure represented in formula V:

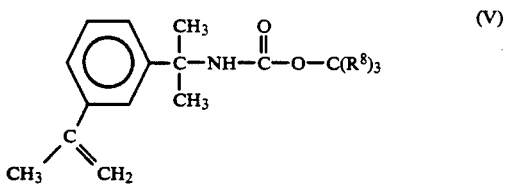

wherein each $R^8$ is independently a $C_{1-10}$ hydrocarbyl moiety, such as alkyl, phenyl, or substituted phenyl, provided that at least one $R^8$ is an alkyl moiety. This monomer is simply prepared by reacting α,α-dimethyl-m-isopropenylbenzyl isocyanate with a tertiary alcohol, such as t-butanol.

A third preferred class of carbamate functionalized vinyl monomers comprises N-t-hydrocarbyloxycarbonyl-m, p-vinylbenzylamines, represented by formula VI hereinbelow:

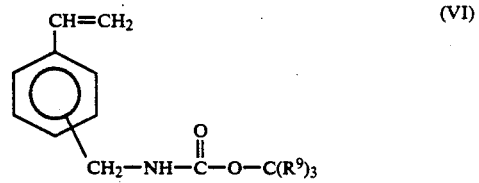

wherein each $R^9$ is independently a $C_{1-10}$ hydrocarbyl moiety, such as alkyl, phenyl or substituted phenyl, provided that at least one $R^9$ is alkyl. The synthesis of Formula VI may be carried out by first reacting m- or p-vinylbenzyl chloride with sodium azide to form vinylbenzyl azide. The latter is reduced with lithium aluminum hydride to form vinylbenzylamine, which reacts with a dicarbonate, such as a di-t-alkyl dicarbonate, to yield N-t-hydrocarbyloxycarbonyl-m,p-vinylbenzylamine.

Comonomers which are suitable for preparing the addition copolymers of this invention include any of the conventional vinyl and/or diene monomers used in free radical polymerization processes, such as acrylonitrile, styrene, methyl methacrylate, methyl acrylate, butadiene and the like. Preferably, the comonomer is acrylonitrile and/or styrene. More preferably, both acrylonitrile and styrene are employed.

The novel addition polymers or copolymers of this invention are prepared by standard free radical polymerization techniques known to those skilled in the art. The carbamate-functionalized vinyl monomer, and optionally one or more conventional vinyl monomers, are polymerized via bulk, suspension, emulsion or solution polymerization methods in the presence of a free radical initiator, such as azobisisobutyronitrile (AIBN) or benzoyl peroxide. Broadly, the carbamate-functionalized vinyl monomer may comprise from about 0.1 to about 100 mole percent of the total monomer feedstream, although the operable concentration may depend upon the specific carbamate-functionalized monomer. For example, {1-methyl-1-[3-(1-methylethenyl)phenyl]ethyl}carbamic acid 1,1-dimethylethyl ester is not readily homopolymerized; therefore, the operable concentration in this case typically ranges from about 0.1 to about 30 and preferably to about 10 mole percent of the total monomer feedstream and, preferably, from about 0.5 to about 4 mole percent. The concentration of the free radical initiator generally ranges from about 0.001 to about 1.0 weight percent based on the total weight of monomers. A variety of organic solvents is suitable for the solution polymerization method; however, halohydrocarbons, such as methylene chloride; ketones, such as methyl ethyl ketone and acetone; and aromatic hydrocarbons, such as toluene and ethylbenzene, are preferred. The temperature of the free radical polymerization generally ranges from about 40° C. to about 150° C., preferably between about 60° C. and 80° C.

The addition polymers and copolymers of this invention possess a weight average molecular weight (as determined by gel permeation chromatography) typically ranging from about 40,000 to about 250,000, preferably, ranging from about 50,000 to about 200,000, and more preferably, ranging from about 60,000 to about 150,000.

The carbamate-functionalized addition polymers and copolymers of this invention are capable of reacting with elastomers containing moieties reactive with amines to form novel addition polymer-rubber copolymer compositions. Elastomers which are suitable for forming such copolymers generally possess a glass transition temperature, Tg, less than about 0° C., more preferably, less than about −20° C. Non-limiting examples of suitable elastomers include ethylene propylene diene comonomer (EPDM) rubbers, ethylene alkene rubbers such as poly(ethylene-co-propylene), polydiene rubbers such as poly(butadiene), and polyacrylates, such as poly(butyl acrylate). Moieties reactive with amines are typically electrophilic moieties, non-limiting examples of which are anhydrides, epoxides, aldehydes, alkyl halides, acyl halides, isocyanates and esters.

In a preferred example, an addition polymer, hereinafter designated SAN-C, prepared by the copolymerization of styrene, acrylonitrile, and a carbamate-functionalized vinyl monomer, is melt extruded with an EPDM rubber functionalized with amine-reactive moieties to afford a high yield of a novel EPDM-SAN-C copolymer. In a more preferred example, SAN-C is reacted with an EPDM rubber functionalized with maleic anhydride to yield a novel EPDM-SAN-C copolymer.

Typically, the reaction between the carbamate-functionalized addition polymer or copolymer and the elastomer is conducted in the melt. It has been shown by gas chromatographic-mass spectrometric analysis that during melt processing the carbamate groups decompose, liberating in situ reactive amine moieties which react with the electrophilic moieties on the elastomer to form the addition polymer-rubber copolymer composition of this invention.

Specifically, the process of preparing the addition polymer-rubber copolymer of this invention comprises mixing an elastomer functionalized with amine-reactive moieties with the carbamate-functionalized addition polymer of this invention and melt reacting the mixture at a temperature ranging from about 170° C. to about 350° C. Preferably, the temperature ranges from about 200° C. to about 260° C. Typical melt processing techniques include continuous extrusion through a single screw or twin screw extrusion device, such as a Welding Engineers 20-mm. twin screw extruder, and melt reaction in a Helicone reactor or Brabender melt mixer. One skilled in the art will recognize that if extrusion is employed, the screw design, screw speed, and feed rate may vary.

Addition polymer-rubber copolymer compositions typically range from about 20 to about 90 weight percent, preferably from about 40 to about 80 weight percent, electrophilic elastomer, and typically from about 80 to about 10 weight percent, preferably from about 60 to about 20 weight percent, carbamate-functionalized addition polymer. Optionally, an unfunctionalized addition polymer, such as SAN, may be added to the addition polymer and elastomer. The concentration of unfunctionalized addition polymer typically comprises from about 0 to about 50 weight percent, preferably from about 0 to about 25 weight percent, based on the weight of the carbamate-functionalized addition polymer. More preferably, no unfunctionalized addition polymer is employed.

The percentage of carbamate-functionalized addition polymer which reacts with the electrophilic elastomer ranges from about 2 to about 20 weight percent, preferably from about 16 to about 20 weight percent. In the aforementioned EPDM-SAN-C composition derived from functionalized EPDM and carbamate-functionalized SAN, the preferred composition ranges from about 40 to about 80 weight percent EPDM and from about 60 to about 20 weight percent SAN-C, and the percentage of SAN-C which reacts with the EPDM copolymer ranges from about 14 to about 20 weight percent.

The addition polymer-rubber copolymer compositions of this invention are useful as compatibilizers and impact modifiers for thermoplastic copolymers, such as SAN. As is well known in the art, melt processing is typically employed to blend polymers. For example, the addition polymer-rubber copolymer of this invention may be dry mixed with a thermoplastic polymer, and the resulting mixture may be extruded at a temperature in the range from about 170° C. to about 290° C. to form the plastic blend. Typically, the concentration of addition polymer-rubber copolymer in the blend ranges from about 10 to about 70 weight percent, preferably from about 30 to about 50 weight percent.

The addition of EPDM-SAN-C copolymers of this invention into SAN results in poly(acrylonitrile-EPDM-styrene) (AES) blends having improved physical properties when compared with corresponding simple blends. For example, tensile bars can be molded from the AES blend on an injection molding machine at about 225° C., and the bars can be tested on an Instron Universal tester. The improved properties include increased notched Izod impact strength, increased maximum elongation, and decreased EPDM particle size. Those skilled in the art will recognize how to test for these properties. The maximum elongation of these blends is usually at least about 12 percent, preferably at least about 15 percent and more preferably at least about 17 percent, as measured by ASTM D638, incorporated herein by reference. AES blends comprising SAN and the EPDM-SAN-C of this invention exhibit notched Izod impact strengths of typically at least about 160 joules/m., preferably at least about 370 joules/m., and more preferably about 350 joules/m., as measured by the American Standard Testing Method (ASTM) D256, also incorporated herein by reference. EPDM particle size is reduced when the EPDM-SAN-C copolymer of this invention is employed in an AES blend, as measured by examination of the sample under a scanning electron microscope.

The following examples are illustrative of the invention.

EXAMPLE 1

A solution comprising 2-aminoethanol (183 g; 3.00 mol) and tetrahydrofuran (THF, 1 L) and a second solution comprising di-t-butyl dicarbonate (652 g, 2.98 mol) and THF (1 L) were pumped at room temperature and at equal rates (about 5.6 mL/min) into a 5 liter, three-necked flask containing THF (2 L) . Over the course of 3 hr, gas evolution was observed and the temperature rose from 24° C. to 64° C. The reaction mixture was then concentrated on a rotary evaporator and vacuum dried for 1 hr at 150 millitorr. A light yellow oil was obtained. For identification purposes, a sample of the oil was purified via flash chromatography on 230–400 mesh silica using a 5/1 solution of hexanes to diethyl ether. The purified oil was identified by proton and carbon-13 nuclear magnetic resonance (NMR) spectroscopy as N-t-butoxycarbonyl-2-aminoethanol.

Crude N-t-butoxycarbonyl-2-aminoethanol (633 g) was diluted with THF (1 L). Likewise, acryloyl chloride (315 g, 3.48 mol) was added to enough THF to make a 1 liter solution. The two solutions were pumped at equal rates over a 2.5 hr period into a 5 L, three-necked flask containing THF (1.5 L) and pyridine (275 g, 3.48 mol). The reaction mixture exothermed over 2.5 hr, and was then cooled and concentrated on a rotary evaporator. The crude, yellow crystalline material which was obtained was purified by recrystallization at 0° C. using a solution of 5:1 hexanes to diethyl ether to yield a white crystalline solid (mp 54°-56° C.). Purification via flash chromatography using 230-400 mesh silica and a 10:1 solution of hexanes to diethyl ether gave N-t-butoxycarbonyl-2-aminoethyl acrylate, also as shown by proton and carbon-13 NMR spectroscopy.

Into a 5 liter, three neck, round bottomed flask equipped with a condenser, mechanical stirred and thermometer were placed styrene (800 mL, 6.93 mol), acrylonitrile (300 mL, 4.56 mol), N-t-butoxycarbonyl-2-aminoethyl acrylate 24.9 g, 115 mmol), AIBN (3.83 g, 23.3 mmol), and methyl ethyl ketone (1.5 L). The mixture was purged with nitrogen for five minutes followed by stirring at 70° C. for 24 hr. The viscous solution was cooled and precipitated into methanol with mechanical agitation. The polymer was isolated by filtration, washed with methanol, and dried in a vacuum oven at 60° C. for 48 hr. A carbamate-functionalized addition copolymer SAN-C (795 g) was produced in 80 percent isolated yield, as shown by infrared and carbon-13 NMR spectroscopy.

Extrusion of SAN-C at 230° C. afforded a material which no longer displayed the t-butyl resonance in the carbon-13 NMR spectrum. Also, the carbamate carbonyl peak in the infrared spectrum essentially disappeared. These observations indicate that at high temperature the carbamate functionalities decompose, presumably releasing isobutylene and carbon dioxide and leaving an unprotected amine functionality in the polymer.

EXAMPLE 2

Distilled water (1000 g) ferrous sulfate heptahydrate (50 mg, 0.179 mmol), and sulfuric acid (2 drops, $pH_{reaction}=3.5-4.5$) were charged to a 3 L jacketed reaction flask. A styrene solution was made by mixing styrene (98%, 763.6 g, 7.33 mol), t-dodecyl mercaptan (3.94 g, 19.5 mmol) and N-t-butoxycarbonyl-2-aminoethyl acrylate (26.1 g, 121 mmol), prepared hereinabove in Example 1. This styrene solution (746.2 g), acrylonitrile (4.55 mol, 241.4 g), sodium formaldehyde sulfoxylate (8 g in 120.0 g total aqueous solution, pump rate 5.0 g/10 min), sodium dodecylbenzene sulfonate (3.0 g in 630 g total aqueous solution, pump rate 16 g/10 min), and t-butyl hydroperoxide (90%, 69.9 mmol, 10.0 g in 120.0 g total independent feed lines over 150 minutes time. The temperature rose within the reaction flask from 15° C. to 45° C. during 150 min of reaction time. A latex polymer was produced having a particle size of 380 nm (Dv=564 nm, Dn=379 nm by Nicomp 370 light scattering).

The contents of the reactor were then poured into a stainless steel beaker containing calcium chloride (30 g) and distilled water (2000 L). The resulting coagulum was filtered by centrifugation and dried in vacuum oven for 48 hr at 60° C. The dried material was ground into a powder utilizing a polymer grinder and redried in a vacuum oven for 10 hr at 40° C. to yield a carbamate-functionalized addition polymer SAN-C. Verification that the butoxycarbamate functionality survived the polymerization conditions was made by Fourier transform infrared (FTIR) spectroscopy on cast films and by carbon-13 NMR spectroscopy.

EXAMPLE 3

Into a 3-neck, 10 L round bottom flask equipped with a mechanical stirrer, condenser, and a nitrogen inlet was placed α,α-dimethyl-m-isopropenylbenzyl isocyanate (1083 g, 5.38 mol), hexane (6 L), and t-butyl alcohol (398.8 g, 5.38 mol). While the mixture was stirred at room temperature, potassium t-butoxide (18.0 g, 160 mmol) was added in portions. Throughout the addition the reaction temperature increased to 50° C. The reaction was complete within an hour. The reaction mixture was washed with water (5 L), and thereafter, the organics were separated from the aqueous layer. The organics were dried over magnesium sulfate, filtered, and evaporated to yield a yellow-brown semi-solid. Recrystallization from hexane afforded essentially pure {1-methyl-1-[3-(1-methylethenyl)phenyl]ethyl}carbamic acid 1,1-dimethylethyl ester (1193 g, 81% isolated yield), as shown by proton and carbon-13 NMR spectroscopy.

A 5 L flask equipped with a mechanical stirrer, condenser, and a temperature probe was charged with 2800 mL water and polyvinylpyrrolidone (PVP, 2.30 g). To this stirred solution was added styrene (746 mL, 6.51 mol), acrylonitrile (370 mL, 7.18 mol), t-dodecyl mercaptan (4.18 g, 20.7 mmol), AIBN (1.30 g, 7.92 mmol), and {1-methyl-1-[3-(1-methylethenyl)phenyl]ethyl}carbamic acid 1,1-dimethylethyl ester (37,18 g, 0.135 mol). The mixture was stirred vigorously (500 rpm) and heated to 73° C. After 5 hr, the reaction was cooled to room temperature with continued stirring. The suspension was filtered by centrifugation, and the solids were washed extensively with methanol. The beads obtained were dried in a vacuum oven for 24 hr at 60° C. to provide a carbamate-functionalized addition copolymer SAN-C (947 g, 86% yield). FTIR spectroscopy confirmed the presence of carbamate functionality.

EXAMPLE 4

Into a 1 L round bottom flask were placed vinylbenzyl chloride (100 g, 655 mmol), dimethylformamide (500 mL), and sodium azide (42.6 g, 655 mmol). The mixture was stirred at room temperature for 24 hr. Diethyl ether (500 mL) was added and the mixture was extracted with water (300 mL). The organic layer was re-extracted with water (300 mL). The combined aqueous layers were extracted with ether (500 mL). The organic layers were combined, dried over magnesium sulfate, filtered, and evaporated to yield a light yellow oil (105 g, about 100% yield) identified as vinylbenzyl azide.

Into a 5 L, 3-neck round bottom flask equipped with a mechanical stirrer, condenser, and an addition funnel were placed lithium aluminum hydride (28.6 g, 754 mmol) and ether (2400 mL). This mixture was stirred at room temperature while a solution of the vinylbenzyl azide (79.2 g, 498 mmol) in ether (300 mL) was added dropwise. Gentle reflux was maintained after a slight induction period. The reaction was monitored by thin layer chromatography (ether:hexane 1:1). The reaction was over after about 4 hr. Water (150 mL) was carefully added followed by 1M sodium hydroxide (300 mL). The mixture was separated and the aqueous layer was extracted with ether (500 mL) twice. The combined organics were dried over magnesium sulfate, filtered, and evaporated to provide a light yellow oil (46.2, g, 70% yield) identified as a mixture of m- and p-vinylbenzylamine.

A solution of the vinylbenzylamine mixture (46.2 g, 347 mmol) in THF (200 mL) and a second solution of di-t-butyl dicarbonate (75.7 g, 347 mmol) in THF (200 mL) were pumped at equal rates (ca. 1.0 mL/min) at room temperature into a 5 L, 3-neck flask containing THF (400 mL). Over the course of 3 hr, gas evolution was observed. The reaction was concentrated on a rotary evaporator followed by vacuum drying at 150 millitorr for 1 hr. The resulting viscous material was columned on silica (230–400 mesh) with hexanes as the eluent to provide a light yellow oil identified as N-t-butoxycarbonyl-m,p-vinyl-benzylamine (62.7 g, 77% isolated yield).

Into a 5 L, 3 neck, round bottom flask equipped with a condenser, mechanical stirrer, and thermometer were added styrene (800 mL, 6.98 mol), acrylonitrile (300 mL, 4.56 mol), N-t-butoxycarbonyl-m,p-vinyl benzylamine (26.92 g, 115 mmol) prepared hereinabove, AIBN (3.83 g, 23.3 mmol), and methyl ethyl ketone (MEK, 1.5 L). The mixture was purged with nitrogen for five minutes and then stirred at 70° C. for 24 hr. The viscous solution was cooled and precipitated into methanol, using mechanical agitation. The resulting carbamate-functionalized addition copolymer (as confirmed by carbon-13 NMR and FTIR spectroscopy) was isolated by filtration, washed with methanol and dried in a vacuum oven for 48 hr at 60° C. Isolated yield 761 g, 76%).

EXAMPLES 5-7

Ethylene-propylene-diene copolymer (EPDM elastomer) (Copolymer Rubber and Chemical Corp., EPsyn 801, 1000 g) was tumble blended with finely ground maleic anhydride (20 g) and dicumyl peroxide (1 g) for 30 min. The mixture was extruded on a Welding Engineers 20-mm. twin screw extruder set to 400 rpm at temperatures in the range of 120°–205° C. The feed rate was gradually increased to afford maximum throughput which yielded a torque reading of 9 amps. The extruded was cooled in a water bath and chopped into pellets. The pellets were dried in a vacuum oven at 60° C. for 24 hr. Analysis by FTIR spectroscopy using succinic anhydride/EPDM mixtures to form a calibration curve indicated that half of the maleic anhydride was present in the extrudate. Multiple precipitations of the EPDM-MA from hot toluene into methanol followed by FTIR analysis indicated that over 95 percent of the maleic anhydride was chemically bonded to the EPDM.

A carbamate-functionalized addition polymer, SAN-1%-1C, prepared from the copolymerization of styrene, acrylonitrile and 1 mole percent 2-(N-t-butoxycarbonylamino)ethyl acrylate, was prepared by free radical solution polymerization, as described in Example 1. The SAN-1%-1C copolymer was tumble blended with EPDM rubber functionalized with (nominally) 2 or 4 weight percent maleic anhydride (EPDM-MA), prepared in a manner similar to that described hereinabove.

The blends prepared are shown in Table I (Samples 5-7). Each of the blends was extruded on a Welding Engineers 20 mm twin screw extruder at 232° C. The copolymer extrudate was cooled in a water bath, pelletized, and dried for 4 hr at 80° C. Samples of the pelletized copolymer (4.0 g) were extracted several times with acetone (35 ml/extraction). The extracted samples were centrifuged at 14,000 rpm for 20 min, and the insolubles were dried in a vacuum oven at 60° C. The extractions removed unreacted SAN leaving EPDM-SAN-C and unreacted EPDM-MA as insolubles. A higher percentage of insolubles corresponds to a higher degree of reaction.

EXAMPLE 8

A SAN-1%-2C addition copolymer was prepared by suspension copolymerization of styrene, acrylonitrile, and 1 weight percent {1-methyl-1-[3-(1-methylethenyl)-phenyl]ethyl}carbamic acid 1,1-dimethylethyl ester, as described in Example 3. The carbamate functionalized copolymer was tumble blended, as shown in Table I, with EPDM-4%-MA, hereinbefore identified as an EPDM rubber functionalized with 4 weight percent maleic anhydride. The addition polymer-rubber copolymer produced was extracted as in Examples 5-7 leaving 57.8 wt percent insolubles.

The results of Examples 5-8 are listed in Table I, in comparison with controls C-1 and C-2 which employed unfunctionalized SAN and unfunctionalized EPDM, respectively.

TABLE 1

| Sample | SAN (Wt. %) + EPDM (Wt. %)[1] | Wt. % Insol. | Wt. % Bound SAN |
|---|---|---|---|
| C-1 | SAN (50%) + EPDM-2%-MA (50%) | 49.3 | 0 |
| C-2 | SAN-1%-1C (50%) + EPDM (50%) | 53.4 | 3.4 |
| 5 | SAN-1%-1C (50%) + EPDM-2%-MA (50%) | 57.0 | 7.0 |
| 6 | [SAN-1%-1C (20%) + EPDM-2%-MA (80%)] preextruded and dried, then blended (62.5%) with SAN-1%-1C (37.5%) | 60.1 | 10.1 |
| 7 | SAN-1%-1C (50%) + EPDM-4%-MA (50%) | 57.9 | 7.9 |
| 8 | SAN-1%-2C (50%) + EPDM-4%-MA (50%) | 57.8 | 7.8 |

[1]SAN-1%-1C is SAN functionalized with 1 mole % of N-t-butoxycarbonyl-2-aminoethyl acrylate.
EPDM-%-MA is EPDM rubber functionalized with given wt. % maleic anhydride.
SAN-1%-2C is SAN functionalized with 1 mole % of {1-methyl-1-[3-(1-methylethenyl)-phenyl]ethyl}carbamic acid 1,1-dimethylethyl ester.

It is seen from Examples 5-8 that the percentage of insolubles ranged from 57.0 to 60.1 weight percent, corresponding to a 7.0 to 10.1 percent bound SAN concentration probably due to copolymer formation. When Example 8 and Example 7 are compared, it is seen that the choice of carbamate-functionalized monomer (1 or 2) incorporated into SAN does not significantly affect the amount of bound SAN. When Examples 5 and 8 are compared, it is seen that increasing the maleic anhydride content of the EPDM rubber enhances copolymer formation. When Example 8 is compared with Controls C-1 and C-2, it is seen that the carbamate-functionalized addition polymer of this invention forms a better copolymer with EPDM-MA than with unfunctionalized EPDM.

By contrast, only 49.3 and 53.4 weight percent insolubles were obtained in the controls, corresponding to essentially no reaction between the polymers. When the controls are compared with Examples 5-7, it is seen that better copolymers are formed with functionalized addition copolymers according to this invention than with unfunctionalized copolymers.

EXAMPLES 9-12

Mixtures of commercially available SAN and EPDM-SAN-C copolymers selected from examples 5-8 were extruded under the extrusion conditions of Example 5. The compositions of the extruded blends are set forth in Table II, in comparison with two controls prepared from the hereinabove-described Controls C-1 and C-2.

TABLE II

| Sample | EPDM-SAN copolymer or blend (50 wt. %) extruded with SAN (50 wt. %) at 232° C. | Wt. Bound SAN | Notched Izod joules/m. | Max. Elong. | Particle Size μm |
| --- | --- | --- | --- | --- | --- |
| C-3 | Control C-1 | 0 | 16 | 6.4 | 20 |
| C-4 | Control C-2 | 1.7 | 16 | 6.3 | 20 |
| 9 | Copolymer 5 | 3.5 | 176 | 16.5 | 1-2 |
| 10 | Copolymer 6 | 5.0 | 529 | 19.0 | 0.5-1 |
| 11 | Copolymer 7 | 4.0 | 401 | 17.3 | 0.5-1 |
| 12 | Copolymer 8 | 3.9 | 433 | 19.3 | 0.5-1 |

It is seen that the AES blends 9-12 in Table II exhibit notched Izod values between 176 and 529 joules/m. Maximum elongation ranges from 16.5 to 19.3 percent. EPDM particle sizes range from 0.5 to 2.0 μm. Even small increases in copolymer concentration can have a significant effect on the physical properties, as shown in the comparison between Examples 9 and 11. Example 10 which contained the highest concentration of EPDM-SAN-C copolymer achieved the best physical properties.

The blending method of Example 6, resulting in the product of Example 10, is disclosed and claimed in copending application Ser. No. 08/066,289.

It is further seen that the notched Izod values of each control is only 16 joules/m.; maximum elongation is about 6.4 percent; and particle size is 20 μm. When Controls C-3 and C-4 are compared with Examples 9-12, it is seen that the presence of the EPDM-SAN-C copolymer of the invention in SAN produces AES blends with significantly improved physical properties.

What is claimed is:

1. A process of preparing an addition polymer-rubber copolymer comprising melt reacting a mixture containing an elastomer having moieties reactive with amines and a carbamate-functionalized addition polymer derived from the free radical polymerization of a carbamate-functionalized vinyl monomer, and optionally, one or more conventional vinyl monomers, the melt reaction being conducted under reaction conditions such that an addition polymer-rubber copolymer is formed.

2. A process according to claim 1 wherein the melt reaction is conducted in an extruder at a temperature between about 170° C. and about 290° C. and wherein the concentration of elastomer ranges from about 20 to about 90 weight percent and the concentration of carbamate-functionalized addition polymer ranges from about 80 to about 10 weight percent.

3. A process according to claim 2 wherein an unfunctionalized addition polymer derived from a free radical polymerizable vinyl monomer is added to the melt, the concentration of the unfunctionalized addition polymer ranging from about 0 to about 50 weight percent based on the weight of the carbamate-functionalized addition polymer.

4. An addition polymer-rubber copolymer represented by the formula:

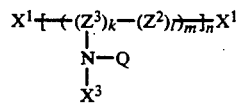

wherein:

Q is an elastomeric segment derived from an elastomer functionalized with moieties reactive with amines;

$X^1$ is a chain terminating group;

$X^3$ is hydrogen or a chemical linkage between N and Q;

$Z^2$ is a divalent unit derived from one or more free radical polymerizable vinyl comonomers;

$Z^3$ is a trivalent unit derived from a carbamate-functionalized divalent unit in an addition polymer by removal of the carbamate group;

k is the number of carbamate-functionalized units and is an integer having a value of 1 or greater;

l is the number of comonomer units and is 0 or an integer having a value of 1 or greater; and wherein k and l may vary independently from one structural unit to the next;

m is the number of structural units and is an integer having a value of 1 or greater; and n is the number of addition polymer side chains bound to the elastomer and is an integer equal to 1 or greater.

5. A copolymer according to claim 4 wherein the addition polymer comprises from about 20 to about 90 weight percent of the copolymer.

6. A copolymer according to claim 4 wherein Q is an EPDM rubber segment derived from an EPDM rubber functionalized with a moiety selected from the group consisting of anhydrides, epoxides, aldehydes, alkyl halides, acyl halides, isocyanates and esters; and wherein $Z^2$ is a divalent unit derived from at least one of styrene or acrylonitrile.

7. A copolymer according to claim 6 wherein $Z^3$ is a divalent unit derived from a carbamate-functionalized vinyl monomer selected from the group consisting of N-t-butoxycarbonyl-2-aminoethyl acrylate, {1-methyl-1-[3-(1-methylethenyl)phenyl]ethyl}carbamic acid 1,1-dimethylethyl ester and N-t-butoxycarbonyl-m,p-vinylbenzylamine.

8. A copolymer according to claim 7 wherein the EPDM segment comprises from about 40 to about 80 weight percent and the addition polymer from about 60 to about 20 weight percent of the composition.

9. An AES copolymer blend having an Izod impact strength of at least about 160 joules/m comprising SAN and the addition polymer-rubber copolymer of claim 4, wherein the rubber segment is EPDM derived from EPDM functionalized with moieties reactive with amines, and wherein the addition polymer segment is derived from a carbamate-functionalized SAN.

10. The blend of claim 9 wherein the Izod impact strength is at least about 370 joules/m.

11. The blend of claim 9 wherein the weight percentage of addition polymer-rubber copolymer ranges from about 10 to about 70 weight percent.

* * * * *